May 27, 1952  A. H. LAMB  2,597,939
BIMETALLIC THERMOMETER
Filed June 24, 1946
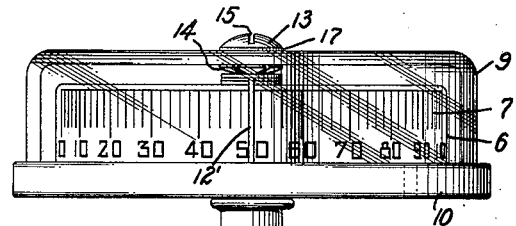
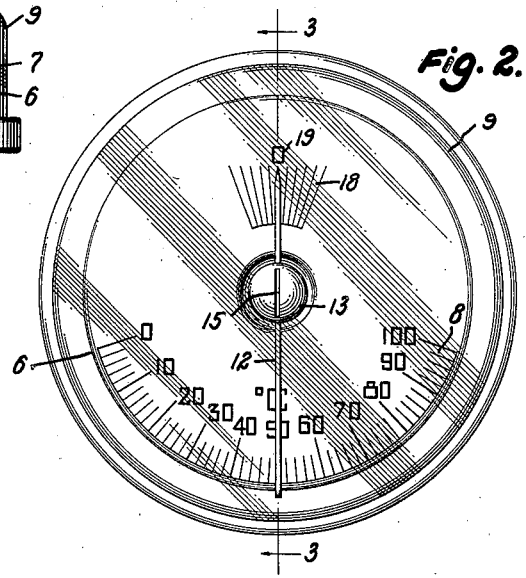
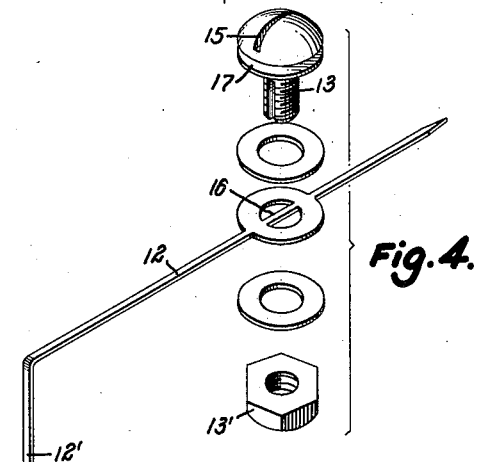
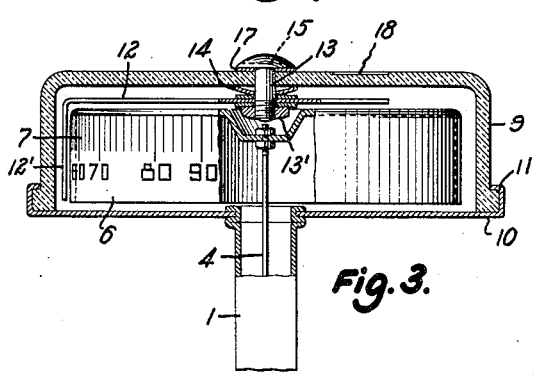
Inventor:
Anthony H. Lamb,
By
Pierce + Scheffler
Attorneys.

Patented May 27, 1952

2,597,939

UNITED STATES PATENT OFFICE 2,597,939

BIMETALLIC THERMOMETER

Anthony H. Lamb, Hillside, N. J., assignor to Weston Electrical Instrument Corporation, Newark, N. J., a corporation of New Jersey Application June 24, 1946, Serial No. 678,736

2 Claims. (Cl. 116—129)

This invention relates to condition responsive indicating instruments such as bimetallic thermometers and particularly to thermometers for industrial uses which may be restandardized if and when a check of the calibration indicates that original accuracy has been lost.

Bimetallic thermometers have been manufactured for household use for many years and, in general, they have been characterized by only a fair degree of uniformity and of accuracy. Improvements in mechanical constructions and in manufacturing methods during the last decade have materially increased the accuracy of the bimetallic thermometers and have resulted in a progressively increasing use of bimetallic thermometers in manufacturing and industrial plants. The usual construction has been a helix, or a plurality of coaxial helices, of bimetallic strips within a tubular shell, one end of the helix or helices being anchored to the shell and the other end being secured to a staff upon which a pointer is mounted for movement over a graduated scale plate in a plane normal to the axis of the bimetallic strip and the staff. These constructions have been of relatively low mechanical stability to satisfy the primary design requirements of high sensitivity and quick response to changes in temperature, and the initial accurate calibration of a thermometer has frequently been destroyed by mechanical shocks or by the "ageing" of the bimetallic element. The prior bimetallic thermometers have not included any elements for correcting or eliminating errors resulting from variations in operating characteristics of the bimetallic element of a thermometer.

An object of the present invention is to provide a bimetallic thermometer with relatively movable graduated scale and pointer elements which may be adjusted to compensate for errors that arise during use of the thermometer. An object is to provide a bimetallic thermometer including a graduated dial movable with respect to a relatively stationary pointer or fiducial mark, and in which the pointer is adjustable angularly to correct for errors arising from drift, shock or other causes.

These and other objects and advantages of the invention will be apparent from the following specification when taken with the accompanying drawing in which:

Fig. 1 is an elevation, with parts in section, of a thermometer embodying the invention;

Fig. 2 is a top plan view of the same;

Fig. 3 is a fragmentary section through the top of the thermometer casing as seen on line 3—3 of Fig. 2, with the graduated dial and fiducial mark shown in elevation; and Fig. 4 is an exploded perspective view, on a larger scale, of the pointer and its supporting devices.

In the drawing, the reference numeral 1 identifies a tubular shell within which a bimetallic coil 2 is supported by the cap 3 which closes the lower end of the shell. The staff 4 is secured to the upper end of the coil 2 and is loosely guided by a ring bearing 5 which is pressed into or soldered within the shell 1. The staff 4 carries a dial member 6 of inverted cup shape which has graduated scales 7 and 8 printed on its rim and its top surface respectively. An inverted cup-shaped cover 9 of glass or a transparent plastic is seated upon a metal disk 10 which is secured to the top of the shell 1, and the rim 11 of the disk is spun over the bottom flange of the cover to complete the housing.

A fiducial mark or pointer 12 is mounted within the cover 9 by a screw 13 which is frictionally held against inadvertent rotation by drawing down the nut 13' to compress the spring washer 14. The pointer 12 may be adjusted angularly by a screwdriver inserted in the kerf 15 of the screw 13 as the screw is slotted and a part 16 of the pointer extends through the slot. A felt or leather washer 17 may be arranged between the head of the screw 13 and the cover 9 to provide a substantially hermetic seal for the housing.

The center part of the dial member 6 is preferably depressed, as shown, to permit location of the pointer 12 close to the graduated scale 8 on the top of the dial member. An end 12' of the pointer 12 is turned down at right angles to form the index for the peripheral scale 7 of the dial member 6. The other end of the pointer extends beyond the screw 13 and lies beneath calibration graduations or radial lines 18 which may be printed on, or as shown in Fig. 3, impressed in the cover 9. The central line of the graduations 18 is identified by a mark or symbol 19, for example a zero, and the thermometer is so adjusted at the factory that the temperature indications at scales 7 and 8 are accurate when the tail of the pointer 12 is alined with this zero graduation, see Fig. 2.

The thermometers may be compared with a standard thermometer from time to time and errors which may have arisen from any cause can be eliminated by turning the screw 13 to shift the indexes 12 and 12' into line with the temperature value as measured by the standard thermometer. A series of errors due to vibration and minor shocks will usually tend to compensate for each other and successive calibration adjustments of the thermometer will shift the pointer 12 back and forth in the neighborhood of the zero calibration line 18. Errors arising from a relief of strains set up during the winding of bimetallic coils result in a progressive drift which will be indicated by a series of adjustments of the pointer 12 in the same sense. The original temperature-angular deflection characteristic of the coil 2 will usually be altered when the accumulated errors reach such value as to necessitate a large angular displacement of the pointer 12 from its initial position. The calibration scale 18 is therefore of limited angular extent, and a calibration check which necessitates an adjustment of the pointer 12 beyond the limits of the scale 18 indicates that the thermometer is probably defective and should be replaced.

The dual scales in planes at right angles to each other permit use of the thermometers in many places where the conventional bimetallic thermometers with scales in a plane normal to the bimetallic coil 2 would be unsatisfactory. The thermometers may be mounted vertically and above eye level in places where the prior thermometers would be impractical.

It is to be understood that the invention is not limited to the particular embodiment herein shown and described as various changes which may be made in the design and location of the several component parts fall within the scope of my invention as set forth in the following claims.

I claim:

1. An indicating system for an instrument including a staff adjustable angularly by a condition-responsive element; said indicating system comprising a dial element provided with a scale of graduations and adapted to be mounted on an end of the instrument staff, a housing including a transparent section through which said scale may be viewed, a relatively stationary pointer rotatably mounted on said housing coaxial with the staff, said pointer being within said housing and providing an index for reading values from said scale of graduations, frictional means normally retaining said pointer against rotational displacement, a scale of calibrations carried by the housing and cooperating with said pointer, and means for rotational adjustment of said pointer with respect to said scale of calibrations.

2. An indicating system as recited in claim 1, wherein said calibration scale is provided with a symbol indicating the angular position of said pointer at the initial calibration of the indicating system.

ANTHONY H. LAMB.

REFERENCES CITED

The following references are of record in the file of this patent:

UNITED STATES PATENTS

| Number | Name | Date |
|---|---|---|
| 1,311,152 | Boyce | July 29, 1919 |
| 1,429,975 | Roth et al. | Sept. 26, 1922 |
| 2,018,536 | Salzgeber | Oct. 22, 1935 |
| 2,048,512 | Oakley | July 21, 1936 |
| 2,513,184 | Lamb | June 27, 1950 |

FOREIGN PATENTS

| Number | Country | Date |
|---|---|---|
| 277,906 | Great Britain | Sept. 29, 1927 |
| 463,594 | Germany | July 31, 1928 |
| 749,753 | France | May 8, 1933 |
| 777,994 | France | Dec. 15, 1934 |